United States Patent
Blake et al.

(10) Patent No.: US 10,331,576 B2
(45) Date of Patent: Jun. 25, 2019

(54) DEADLOCK AVOIDANCE IN A MULTI-PROCESSOR COMPUTER SYSTEM WITH EXTENDED CACHE LINE LOCKING

(71) Applicant: International Business Machines Corporation, Armonk, NY (US)

(72) Inventors: Michael A. Blake, Wappingers Falls, NY (US); Pak-kin Mak, Poughkeepsie, NY (US); Robert J. Sonnelitter, III, Wappingers Falls, NY (US); Timothy W. Steele, Poughkeepsie, NY (US); Gary E. Strait, Poughkeepsie, NY (US); Poornima P. Sulibele, Bangalore (IN); Guy G. Tracy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 15/496,525

(22) Filed: Apr. 25, 2017

(65) Prior Publication Data
US 2018/0307628 A1    Oct. 25, 2018

(51) Int. Cl.
G06F 12/14 (2006.01)
G06F 12/0891 (2016.01)
G06F 13/40 (2006.01)

(52) U.S. Cl.
CPC ...... *G06F 12/1466* (2013.01); *G06F 12/0891* (2013.01); *G06F 13/4036* (2013.01); *G06F 2212/1052* (2013.01)

(58) Field of Classification Search
CPC ............. G06F 12/1466; G06F 12/0891; G06F 13/4036; G06F 2212/1052
See application file for complete search history.

(56) References Cited

U.S. PATENT DOCUMENTS

| 5,016,167 | A | * | 5/1991 | Nguyen | ................. G06F 9/524 711/151 |
| 6,073,182 | A | | 6/2000 | Jones et al. | |
| 6,738,871 | B2 | | 5/2004 | Van Huben et al. | |

(Continued)

OTHER PUBLICATIONS

Christian Jacobi, et al.; Transactional Memory and Implementation for IBM System Z; 2012 IEEE/ACM 45th Annual Symposium on Microarchitecture; pp. 25-36.

(Continued)

*Primary Examiner* — Eric Cardwell
(74) *Attorney, Agent, or Firm* — Cantor Colburn LLP; William Kinnaman

(57) ABSTRACT

A computer implemented method for avoiding false activation of hang avoidance mechanisms of a system is provided. The computer implemented method includes receiving, by a nest of the system, rejects from a processor core of the system. The rejects are issued based on a cache line being locked by the processor core. The computer implemented method includes accumulating the rejects by the nest. The computer implemented method includes determining, by the nest, when an amount of the rejects accumulated by the nest has met or exceeded a programmable threshold. The computer implemented method also includes triggering, by the nest, a global reset to counters of the hang avoidance mechanisms of a system in response to the amount meeting or exceeding the programmable threshold.

18 Claims, 3 Drawing Sheets

(56) References Cited

U.S. PATENT DOCUMENTS

| | | |
|---|---|---|
| 6,738,872 B2 | 5/2004 | Van Huben et al. |
| 7,340,596 B1 * | 3/2008 | Crosland .................. G06F 1/24 713/1 |
| 9,104,513 B1 | 8/2015 | Fee et al. |
| 9,329,890 B2 | 5/2016 | Busaba et al. |
| 2005/0223302 A1 * | 10/2005 | Bono .................. G06F 11/0757 714/55 |
| 2015/0378735 A1 | 12/2015 | Gschwind et al. |

OTHER PUBLICATIONS

IBM Support (online); retrieved Apr. 24, 2017 from the Internet at http://www-01.ibm.com/support/docview.wss? uid=nas8N1020491.

* cited by examiner

DEADLOCK AVOIDANCE IN A MULTI-PROCESSOR COMPUTER SYSTEM WITH EXTENDED CACHE LINE LOCKING

BACKGROUND

The disclosure relates generally to deadlock avoidance in a multi-processor computer system with extended cache line locking.

As contemporary multi-processor computer designs have scaled to larger symmetric multiprocessing (SMP) systems, performance issues around contentious cache lines have become more noticeable to the system. In SMP systems, a traditional deadlock avoidance mechanism based on a length of time that an operation is valid for is implemented to address functional and performance issues. That is, the traditional deadlock avoidance mechanism is initiated to help an operation make forward progress, if that operation is valid for longer than a set time. Additionally, in SMP systems, a next instruction access intent (NIAI) lock instruction can be utilized by a processor core to purposefully hold onto a cache line for an extended period of time to allow the processor core to complete critical sections of code. In this case, while the NIAI lock instruction is purposefully holding the cache line, the traditional deadlock avoidance mechanism (which is based solely on the duration of an operation) can falsely activate and cause instruction sequences waiting on the hold to interfere with other unrelated instruction sequences.

SUMMARY

According to one or more embodiments, a computer-implemented method for avoiding false activation of hang avoidance mechanisms of a system is provided. The computer-implemented method includes receiving, by a nest of the system, rejects from a processor core of the system. The rejects are issued based on a cache line being locked by the processor core. The computer-implemented method includes accumulating the rejects by the nest. The computer-implemented method includes determining, by the nest, when an amount of the rejects accumulated by the nest has met or exceeded a programmable threshold. The computer-implemented method also includes triggering, by the nest, a global reset to counters of the hang avoidance mechanisms of a system in response to the amount meeting or exceeding the programmable threshold.

According to one or more embodiments, the above computer-implemented method can be provided in a computer program product or a system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In view of the above, embodiments disclosed herein may include system, method, and/or computer program product (herein system) that tracks an accumulation of rejections of hot cache lines with respect to a programmable threshold to perform a global reset in lieu of triggering a hang avoidance mechanism.

The system comprises a combination of hardware (e.g., multiple processor cores) and software that form a nested architecture (nest) across multiple processor cores. That is, the nest itself is a combination of system hardware and software that can manage operations and communication of multiple processor cores of the system. The system can include a memory supporting hot cache lines, which are cache lines that most or all of the multiple processor cores of the system are trying to read or modify. Hot cache lines can comprise a lock that a processor core of multiple processor cores can set (using the NIAI lock instruction) when reading or modifying that hot cache line.

When the processor core has locked the hot cache line (to hold on to the hot cache line for an extended period of time) and the nest attempts to take the hot cache line away from the processor core by a nest request on behalf of another processor, the processor core will reject the nest request with an indication that the hot cache line has been locked. The nest will track and accumulate these indications. If a programmable threshold of these indications is reached, the nest will trigger a reset of a nest hang avoidance mechanism throughout the system. This reset by the nest ensures that any requests that are queued and waiting to access a hot cache line that is locked by the processor core will not falsely activate the nest hang avoidance mechanism. Further, these operations by the nest avoid performance degradation of the system when the core is deliberately holding on to a hot cache line.

Thus, embodiments described herein are necessarily rooted in the processor core and the nest of the system to perform proactive operations to overcome problems specifically arising in the realm of the traditional deadlock avoidance mechanisms that are based only operation duration. These problems include the false activation of the traditional deadlock avoidance mechanisms, resulting in unwanted processing costs and expenses (note that activating the traditional deadlock avoidance mechanism too frequently results in significant performance degradation).

Figure 1:
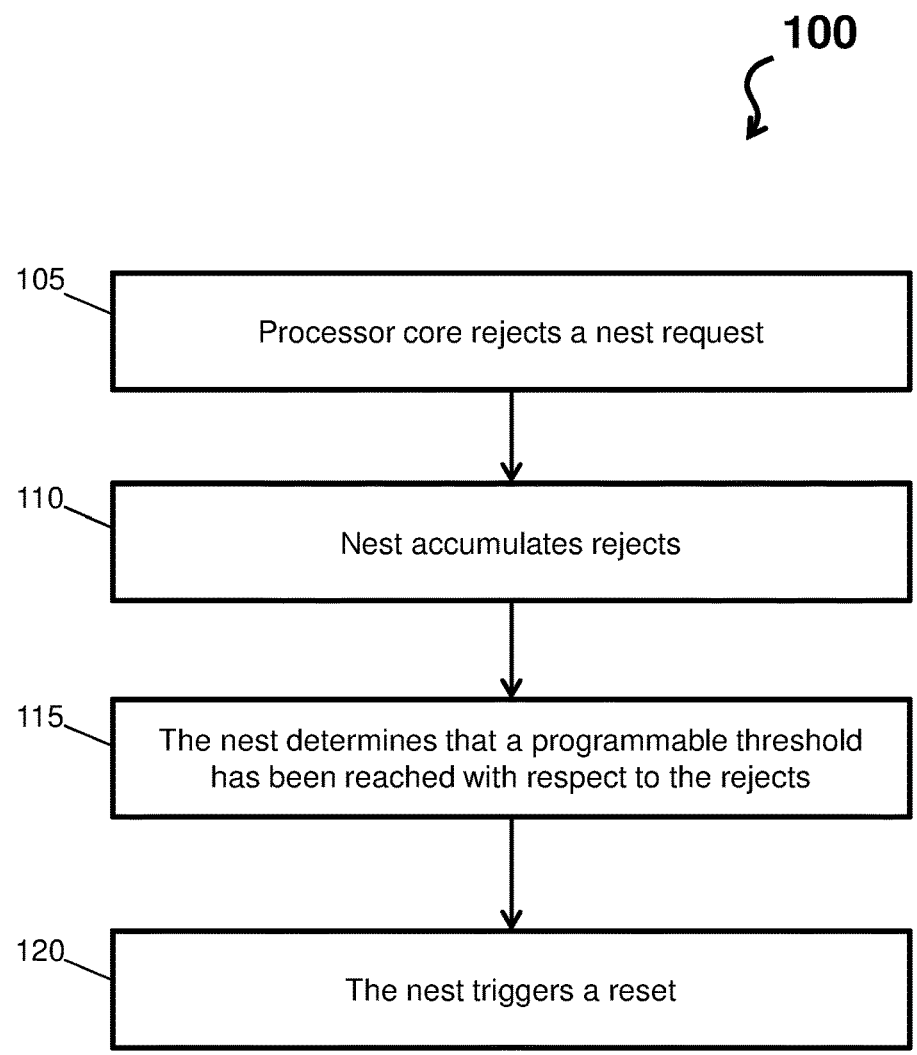
FIG. 1 depicts a process flow of system in accordance with one or more embodiments.

Turning now to FIG. 1, a process flow 100 is generally shown in accordance with an embodiment. The process flow 100 is an operational example of deadlock avoidance in a multi-processor computer system with extended cache line locking. The multi-processor computer system (e.g., the system described herein) can be an electronic, computer framework comprising and/or employing any number and combination of computing device and networks utilizing various communication technologies, as described herein. The large distributed SMP environment can be easily scalable, extensible, and modular, with the ability to change to different services or reconfigure some features independently of others.

The process flow 100 begins at block 105, where a processor core of the system rejects a nest request. Note that the processor core rejects the nest request when the processor core has locked a cache line (so that it will hold on to it for an extended period of time) and a nest of the system attempts to take the cache line away from the processor core (cause the release of control). The reject by the processor core comprises an indication that the cache line has been locked.

At block 110, the nest tracks and/or accumulates rejects (issued based on the cache line being locked). At block 115, the nest determines that a programmable threshold (e.g., a predetermined value set in the nest) has been reached (e.g., met or exceeded) with respect to the rejects. At block 120, in response to the programmable threshold being reached, the nest triggers a reset (e.g., a global reset). The global reset is a message that causes the nest hang avoidance mechanisms throughout the system to reset their corresponding counters. The global reset in response to the accumulation of rejects ensures that any requests that are queued and waiting to access the cache line that is locked by the processor core will not falsely activate the nest hang avoidance mechanism.

Figure 2:
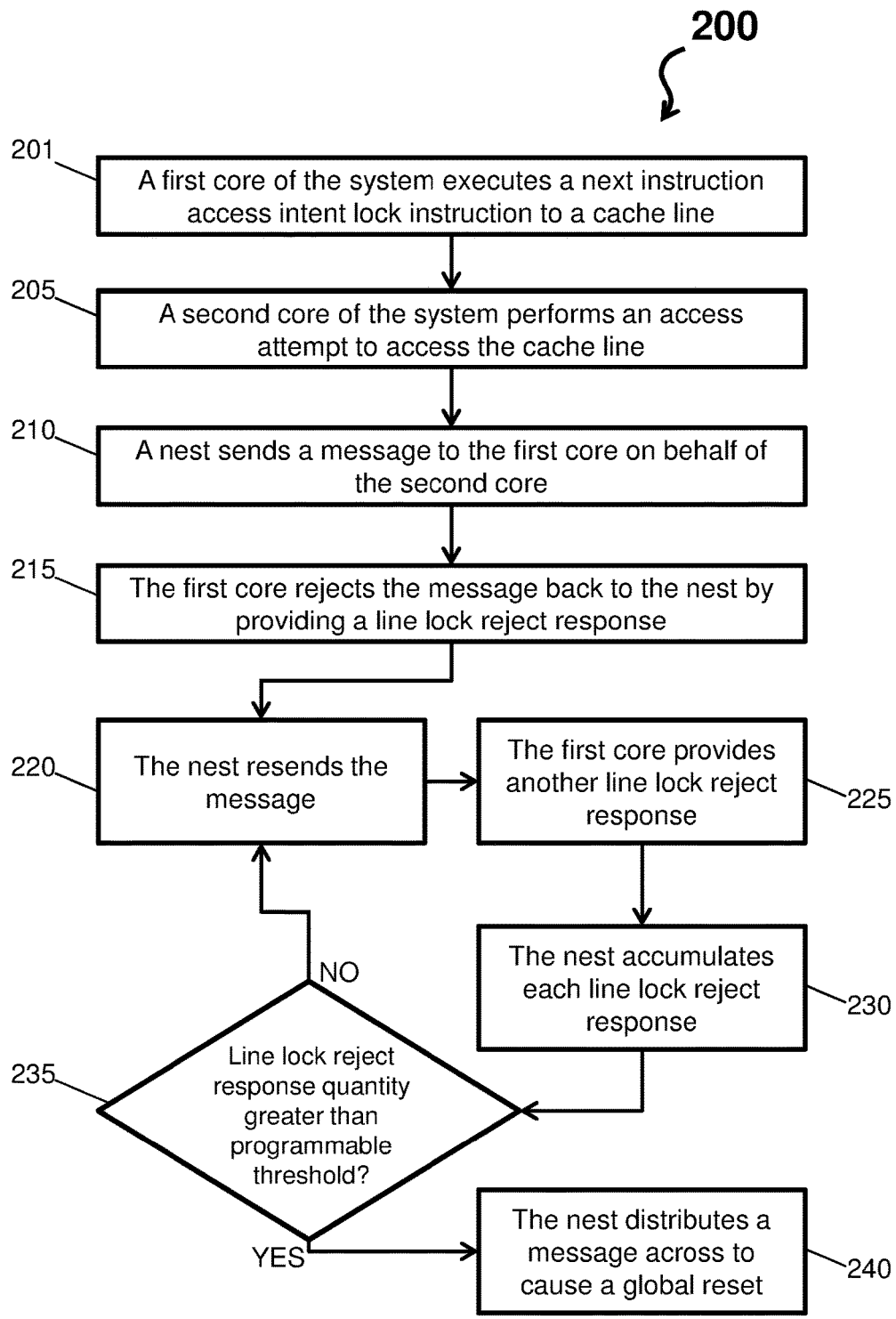
FIG. 2 depicts a process flow of system in accordance with one or more embodiments.

Turning now to FIG. 2, a process flow 200 is generally shown in accordance with an embodiment. The process flow 200 is an operational example of a deadlock avoidance mechanism in a large distributed SMP environment where processor cores can deliberately lock access to memory locations. The large distributed SMP environment (e.g., the system) can be an electronic, computer framework comprising and/or employing any number and combination of computing device and networks utilizing various communication technologies, as described herein. The large distributed SMP environment can be easily scalable, extensible, and modular, with the ability to change to different services or reconfigure some features independently of others.

The process flow 200 begins at block 201, where a first core of the system executes an NIAI lock instruction to a cache line A of the memory of the system. The NIAI lock instruction effectively locks that cache line A for use by the first core.

At block 205, a second core of the system performs an access attempt the cache line A, which is locked by the first core. The attempt to access the cache line A can be in the form of an access request (e.g., a read request or a read/write request) to the nest of the system. The read request or the read/write request identifies the cache line A. Note that the nest can perform a cache lookup to determine the status of the cache line identified by the attempt by the second core. In this case, the cache line identified by the access request is the cache line A, and the nest determines that the status of the cache line A is owned by the first core.

At block 210, the nest sends a message to the first core on behalf of the second core. The message is a request to the first core to give up ownership of the cache line A (i.e., release the lock on the cache line A). At block 215, the first core rejects the message back to the nest by providing a line lock indication in a reject response (e.g., line lock reject responses).

The nest then enters into a monitoring operation, as shown in blocks 220, 225, and 230 and decision block 235. At block 220, the nest resends the message (e.g., retries to unlock the cache line A). At block 225, the first core provides another line lock reject response. At block 230, the nest accumulates each line lock reject response received from the first core.

At decision block 235, the nest monitors a number of line lock indications received against a programmable threshold (e.g., a predetermined value set in the nest). In this way, the nest monitors for long lasting locks based on a quantity of the line lock reject responses. Particularly, at block 235, if a 'long-lasting' lock is detected in accordance with the quantity of the line lock reject responses being the same as or greater than the programmable threshold (e.g., met or exceeded), the process flow 200 proceed to block 240. At block 240, the nest distributes a message across the system to cause a global reset. For instance, the nest distributes a message to all processor chips of the system that could be impacted by the lock on the cache line A. The message includes an instruction to reset a corresponding FHQ counters within that processor. The message thereby causes a global reset for all affected processors.

The technical effects and benefits of embodiments of the system herein include the ability to detect a long lasting lock outside of utilizing duration and the ability to distribute a long-lasting lock indication across a distributed SMP system. Further, technical effects and benefits of embodiments of the system herein include the ability to dynamically alter hang avoidance mechanism for operations affected by the lock, along with signaling a line lock condition between cache levels. In this way, the system herein leverages 'hot' cache lines or false sharing to result in higher processor utilization and consumption with less throughput.

Figure 3:
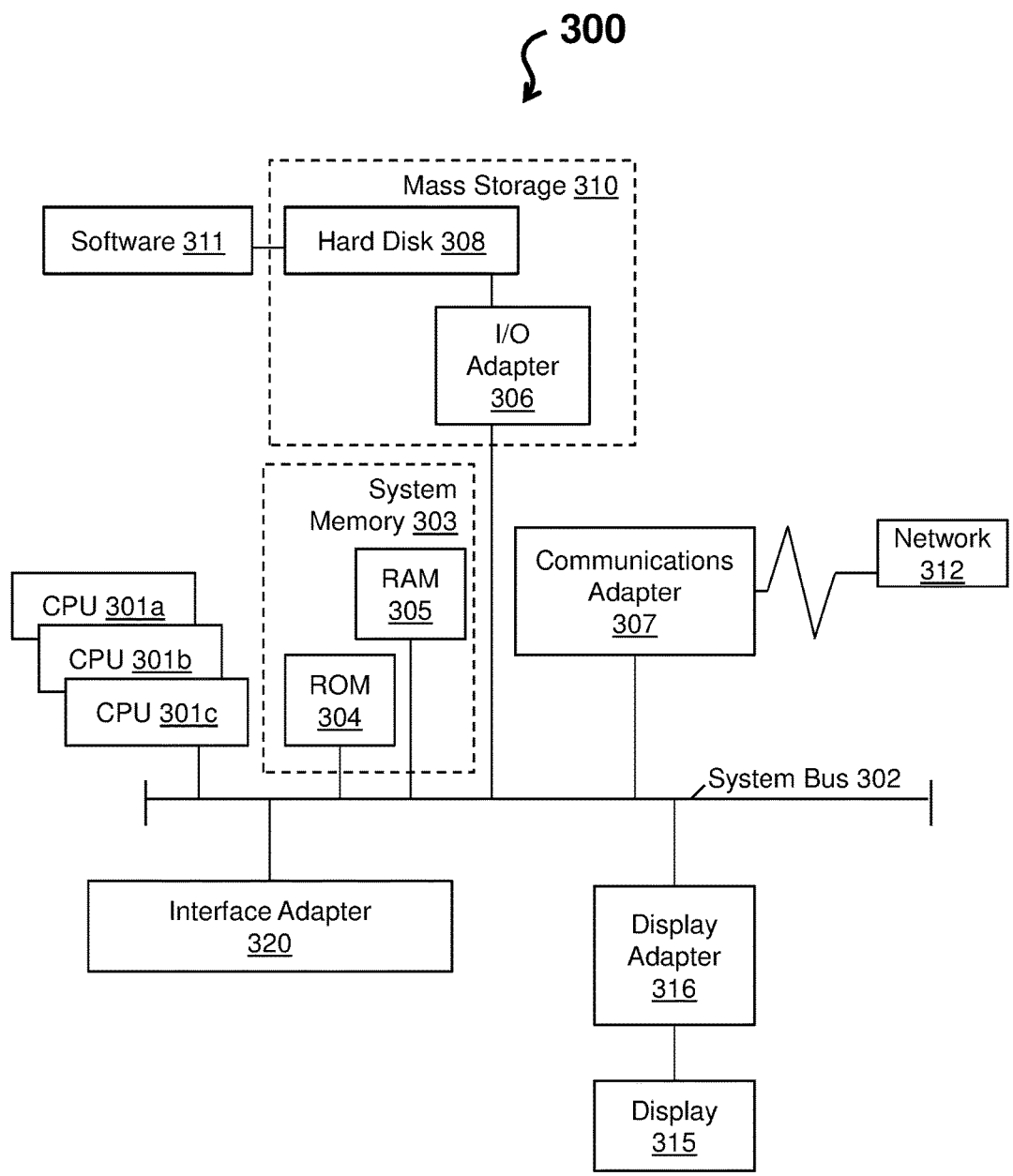
FIG. 3 depicts a processing system in accordance with one or more embodiments.

FIG. 3 depicts a system 300 as an example of the system as described herein in accordance with one or more embodiments. The system 300 has one or more central processing units (CPU(s)) 301a, 301b, 301c, etc. (collectively or generically referred to as processor(s) 301). The processors 301, also referred to as processing circuits, are coupled via a system bus 302 to system memory 303 and various other components. The system memory 303 can include a read only memory (ROM) 304 and a random access memory (RAM) 305. The ROM 304 is coupled to the system bus 302 and may include a basic input/output system (BIOS), which controls certain basic functions of the system 300. The RAM is read-write memory coupled to the system bus 302 for use by the processors 301.

FIG. 3 further depicts an input/output (I/O) adapter 306 and a communications adapter 307 coupled to the system bus 302. The I/O adapter 306 may be a small computer system interface (SCSI) adapter that communicates with a hard disk 308 and/or any other similar component. The I/O adapter 306 and the hard disk 308 are collectively referred to herein as a mass storage 310. Software 311 for execution on the system 300 may be stored in the mass storage 310. The mass storage 310 is an example of a tangible storage medium readable by the processors 301, where the software 311 is stored as instructions for execution by the processors 301 to cause the system 300 to operate, such as is described herein with reference to FIGS. 1-2. Examples of computer program product and the execution of such instruction is discussed herein in more detail. Referring again to FIG. 3, a communications adapter 307 interconnects the system bus 302 with a network 312, which may be an outside network, enabling the system 300 to communicate with other such systems. A display (e.g., screen, a display monitor) 315 is connected to the system bus 302 by a display adapter 316, which may include a graphics controller to improve the performance of graphics intensive applications and a video controller. In one embodiment, the adapters 306, 307, and 316 may be connected to one or more I/O buses that are connected to the system bus 302 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 302 via an interface adapter 320 and the display adapter 316. A keyboard, a mouse, a speaker, etc. can be interconnected to the system bus 302 via the interface adapter 320, which may include, for example, a Super I/O chip integrating multiple device adapters into a single integrated circuit.

Thus, as configured in FIG. 3, the system 300 includes processing capability in the form of the processors 301, and, storage capability including the system memory 303 and the mass storage 310, input means such as the keyboard and the mouse, and output capability including the speaker and the display 315. In one embodiment, a portion of the system memory 303 and the mass storage 310 collectively store an operating system, such as the z/OS or AIX operating system from IBM Corporation, to coordinate the functions of the various components shown in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for avoiding false activation of hang avoidance mechanisms of a system comprising a nest and a plurality of processor cores, comprising:
   receiving, by the nest of the system, rejects from a processor core of the plurality of processor cores, wherein the rejects are issued based on a cache line being locked by the processor core, wherein the nest comprises a combination of system hardware and software that manages operations and communication of the plurality of processor cores of the system;
   accumulating, by the nest, the rejects;
   determining, by the nest, when an amount of the rejects accumulated by the nest has met or exceeded a programmable threshold; and
   triggering, by the nest, a global reset to counters of the hang avoidance mechanisms of a system in response to the amount meeting or exceeding the programmable threshold, wherein the global reset comprises an instruction message that causes the hang avoidance mechanisms throughout the system to reset their corresponding counters, wherein the hang avoidance mechanisms are implemented based on a length of time that the cache line being locked.

2. The computer implemented method of claim 1, wherein the rejects are issued by the processor core in response to the nest attempting to release control of the cache line.

3. The computer implemented method of claim 1, wherein the reject comprises an indication that the cache line is locked.

4. The computer implemented method of claim 1, comprising executing, by the processor core, a next instruction access intent lock instruction to purposefully hold onto the cache line for an extended period of time.

5. The computer implemented method of claim 1, comprising executing, by a second processor core of the plurality of processor cores, an access attempt of the cache line.

6. The computer implemented method of claim 5, comprising sending, by the nest, a message on behalf of the second processor core to the processor core to access the cache line in response to the access attempt.

7. A computer program product for avoiding false activation of hang avoidance mechanisms of a system, the computer program product comprising a non-transitory computer readable storage medium having program instructions embodied therewith, the program instructions executable by the system to cause a nest of the system to: receive rejects from a processor core of the plurality of processor cores, wherein the rejects are issued based on a cache line being locked by the processor core, wherein the nest comprises a combination of system hardware and software that manages operations and communication of the plurality of processor cores of the system; accumulate the rejects; determine when an amount of the rejects accumulated by the nest has met or exceeded a programmable threshold; and trigger a global reset to counters of the hang avoidance mechanisms of a system in response to the amount meeting or exceeding the programmable threshold, wherein the global reset comprises an instruction message that causes the hang avoidance mechanisms throughout the system to reset their corresponding counters, wherein the hang avoidance mechanisms are implemented based on a length of time that the cache line being locked.

8. The computer program product of claim 7, wherein the rejects are issued by the processor core in response to the nest attempting to release control of the cache line.

9. The computer program product of claim 7, wherein the reject comprises an indication that the cache line is locked.

10. The computer program product of claim 7, wherein the program instructions are further executable by the system to cause the processor core to a next instruction access intent lock instruction to purposefully hold onto the cache line for an extended period of time.

11. The computer program product of claim 7, wherein the program instructions are further executable by the system to cause a second processor core of the plurality of processor cores to execute an access attempt of the cache line.

12. The computer program product of claim 11, wherein the program instructions are further executable by the system to cause the nest to send a message on behalf of the second processor core to the processor core to access the cache line in response to the access attempt.

13. A system comprising a nest, a memory, and a plurality of processor cores, the memory storing thereon program instructions for avoiding false activation of hang avoidance mechanisms of the system, the program instructions executable by the system to cause the nest to: receive rejects from a processor core of the plurality of processor cores, wherein the rejects are issued based on a cache line being locked by the processor core, wherein the nest comprises a combination of system hardware and software that manages operations and communication of the plurality of processor cores of the system; accumulate the rejects; determine when an amount of the rejects accumulated by the nest has met or exceeded a programmable threshold; and trigger a global reset to counters of the hang avoidance mechanisms of a system in response to the amount meeting or exceeding the programmable threshold, wherein the global reset comprises an instruction message that causes the hang avoidance mechanisms throughout the system to reset their corresponding counters, wherein the hang avoidance mechanisms are implemented based on a length of time that the cache line being locked.

14. The system of claim 13, wherein the rejects are issued by the processor core in response to the nest attempting to release control of the cache line.

15. The system of claim 13, wherein the reject comprises an indication that the cache line is locked.

16. The system of claim 13, wherein the program instructions are further executable by the system to cause the processor core to a next instruction access intent lock instruction to purposefully hold onto the cache line for an extended period of time.

17. The system of claim 13, wherein the program instructions are further executable by the system to cause a second processor core of the plurality of processor cores to execute an access attempt of the cache line.

18. The system of claim 17, wherein the program instructions are further executable by the system to cause the nest to send a message on behalf of the second processor core to the processor core to access the cache line in response to the access attempt.

* * * * *